O. A. KENYON.
ELECTRIC WELDING.
APPLICATION FILED JAN. 9, 1918.

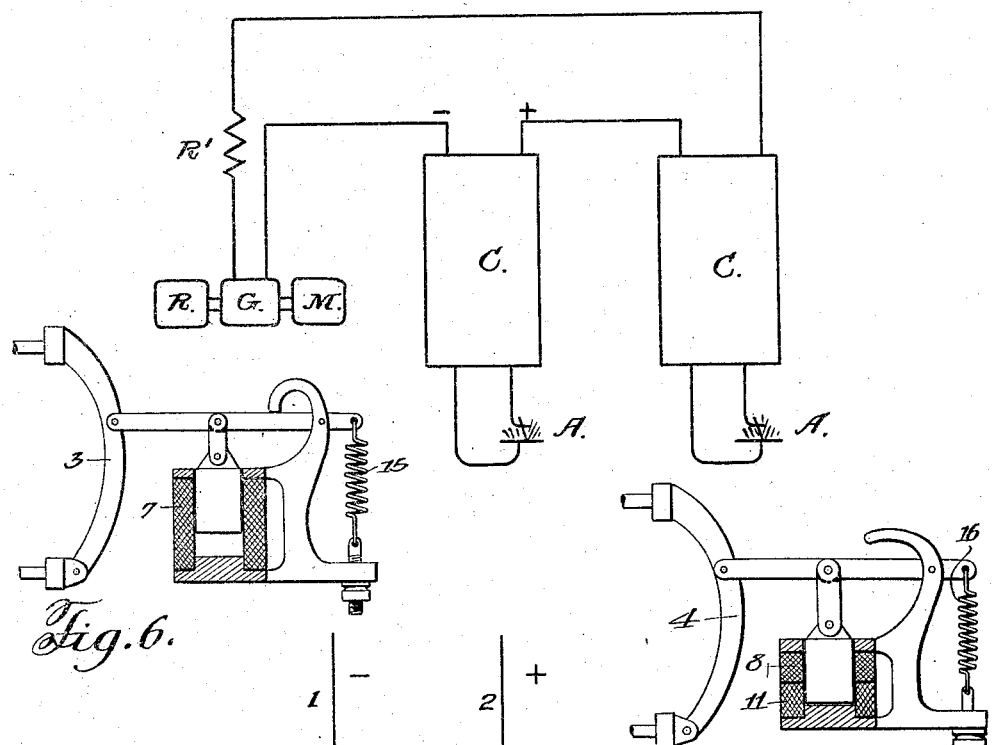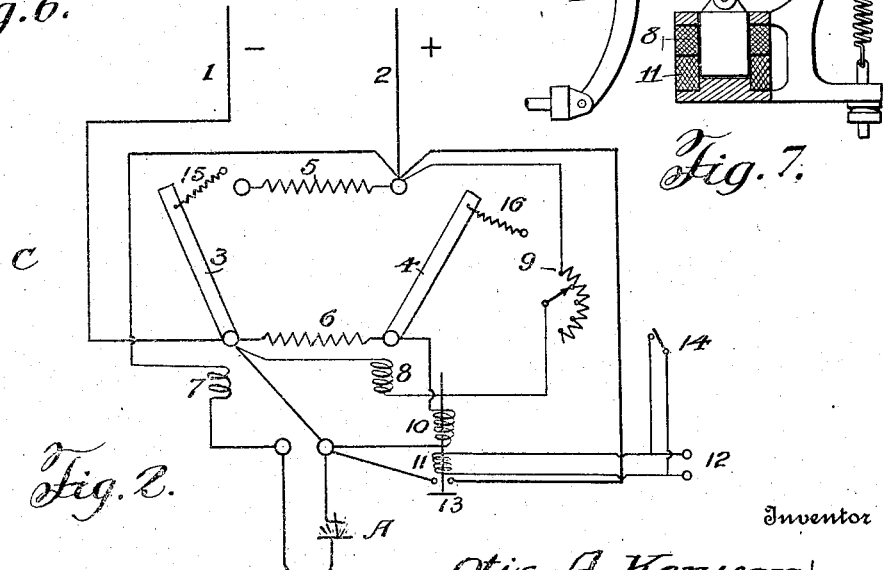

1,303,681.

Patented May 13, 1919.
2 SHEETS—SHEET 2.

Witness:
Jas. E. Hutchinson

Inventor:
Otis A. Kenyon
By T. Walter Fowler
Attorney:

UNITED STATES PATENT OFFICE.

OTIS ALLEN KENYON, OF NEW YORK, N. Y.

ELECTRIC WELDING.

1,303,681.  Specification of Letters Patent.  Patented May 13, 1919.

Application filed January 9, 1918. Serial No. 211,082.

*To all whom it may concern:*

Be it known that I, OTIS A. KENYON, a citizen of the United States, residing at New York city, in the county of New York and State of New York, have invented certain new and useful Improvements in Electric Welding, of which the following is a specification.

My invention relates to certain new and useful improvements in arc welding systems and the invention consists of the parts and the constructions, arrangements and combinations of parts which I will hereinafter describe and claim.

In the accompanying drawings forming part of this specification and in which similar reference characters indicate like parts in the several views;

Figure 1 is a diagram showing the application of subdivided line resistances to a series arc welding system.

Fig. 2 illustrates the interior connection of one of the arc controllers, C.

Figure 3:
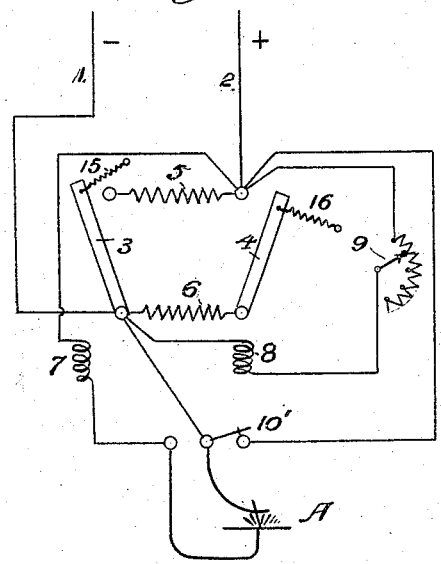
Fig. 3 illustrates internal connections for a controller which does not involve automatic means of removing a resistor from the line circuit after the arc has been extinguished.

Figs. 6 and 7 illustrate in detail part elevations and part sectional views of the contactors 3 and 4, respectively, and coacting coils.

In connection with the series arc welding system described and claimed in former Patent No. 1,181,227, dated May 2, 1916, it is found desirable to connect a resistance in the main line, on account of the fact that the line resistance itself is not sufficient to absorb shocks, due to sudden changes in load voltage and this allows momentary swings in the current which interfere with other welders on the line. In order to overcome this, I have resorted to the use of a resistance permanently connected in the line, the function of this resistance being, to dampen the current fluctuations by absorbing energy. While this resistance as compared with the resistance required by constant potential sytems, is negligible, nevertheless it is highly desirable to be able to reduce it to a minimum.

In the present invention, it is my purpose to subdivide the artificial line resistance leaving part of the resistance permanently in the line and the remainder divided equally between the welding outlets and connected in such way that it is in circuit only when the operator is not welding, but it is so connected as to go in circuit at the moment the operator stops welding, and in some instances a moment later it may be removed from the circuit automatically.

In Figs. 1 and 2, I illustrate the application of my subdivided line resistance to a series arc welding system such as is covered by the aforesaid prior patent.

Fig. 1 shows diagrammatically the series arc welding system operated by a self-regulating motor-generator set, wherein M represents the motor; G the generator; R the regulator; R' the permanent line resistance; C the arc controller; and A the welding arc. The constructions and general arrangements of these parts may be of the usual or any desired form, but in Fig. 2 I show the internal connection of an arc controller, C, which will be found very useful in the carrying out of my invention. In this figure 1 and 2 are the line conductors; 3 and 4 are contactors; 5 and 6 are resistors; 7, 8, 10 and 11 are coils; 9 is a rheostat; 12 is an external source of excitation; 13 is a contactor; 14 is a circuit closer or push button; and 15 and 16 are springs connected to the contactors, 3 and 4.

In this arrangement, the line comes in at 1. Normally, the contactors 3 and 13 are closed and the circuit closer 14 is opened so that under those conditions the current beginning at 1, passes directly through the conductors to the contactor, 13, and from there it passes to the conductor, 2. When the welder is ready to begin operation, he closes the circuit by pressing the button, 14, which shorts circuits the winding or coil, 11, known as the holding coil, and this opens the contactor, 13. Now, the circuit is made through the contactor, 3, and the resistor, 5, to the line 2, and across the terminals of the arc, A, where we have a voltage equivalent to the drop in the resistor, 5. The operation of bringing the terminals of the arc together preparatory to starting an arc, will now draw current through the coil, 7, which opens the contactor, 3, against the pull of its spring, 15, thereby leaving the arc as the only circuit in series with the line. Under these conditions, the current continues to pass through the arc as long as the length of said arc does not exceed a predetermined amount.

It will also be noted that across the arc is connected the coil, 8, which is in series with the rheostat, 9, and when the arc voltage, which is a measure of the length of the arc, reaches a predetermined value, sufficient current will pass through the coil, 8, to close the contactor, 4, against the pull of its spring, 16, thereby inserting the resistor, 6, which is one of the subdivisions of the line before referred to, and in this way killing the arc, which will send a main line current through the resistor, 6. This resistor being included between the terminals of the coil, 8, will cause enough current to be sent through said coil to hold the contactor, 4, in the closed position.

Across the resistor, 6, I also have the coil, 10, and the current through said resistor will send sufficient current through the coil, 10, to close the contactor, 13, and this will short circuit the resistor, 6, and hold the coil, 11, excited from the external source, 13; the short circuit will be maintained until the welder is again ready to start, by pressing the button, 14. The contactor, 3, is closed at the same moment that current ceases in the arc circuit, because extinguishing the arc cuts off excitation of the coil, 7, and allows the spring, 15, to close the contactor, 3, thus the system is restored to its original position and is ready to start welding, as above described.

In Fig. 3 I show the application of my invention to a controller which does not involve automatic means of removing the resistor, 6, from the line circuit after the arc has been extinguished. Whenever it is desired to cut out the resistor, 6, it is necessary to close the hand switch, 10′, which short circuits the panel and renders it inoperative. In this Fig. 3, the resistor, 6, is utilized to maintain sufficient current through the coil, 8, to hold the contactor, 4, in the closed position, and when the arc is struck, it short circuits the resistor, 6 and coil, 8, and allows the contactor, 4, to open. It is manifest that the closing of the switch, 10′, will accomplish the same purpose.

Figure 4:
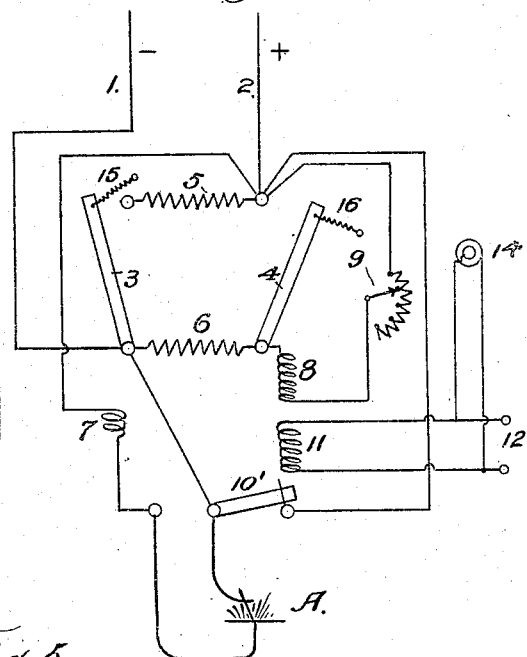
Fig. 4 illustrates another method of connecting the controller.

In Fig. 4, I show another method of connecting the controller which does not provide automatic means for removing the resistor, 6, from the circuit, after the arc has been extinguished, but in this particular instance, I do not rely upon the drop through the resistor to hold the contactor, 4, in the closed position. For this last named purpose, in the instance noted, I utilize the holding coil, 11, excited from its source, 12, the switch being released by the push button, 14, when it is desired to begin welding.

Referring again to Fig. 2, the cycles of operation are substantially as follows:

I begin with practically no voltage between the terminals, 1 and 2, and by dropping out the contactor, 13, I insert the resistance, 5, which gives a voltage approximately equal to the normal arc. The striking of the arc does not change this voltage appreciably, but the drawing out of the arc to a maximum predetermined length, raises the voltage gradually, and when the predetermined value is reached, it is dropped suddenly to that corresponding to the resistance, 6, and a moment later it is dropped back to zero by short circuiting said resistance. Formerly, when the predetermined voltage was reached, this being the maximum load across the arc, the closing of the contactor, 4, short circuited the panel completely, thereby making a comparatively large and very sudden change in voltage.

In the construction found in Fig. 3, the operation is substantially as follows:

The contactors 3 and 4 are assumed to be closed at the beginning of the operation. Touching the arc to the work short circuits the coil, 8, and this allows the contactor, 4, to open; practically speaking, the contactors, 3 and 4, open simultaneously. As the arc is drawn out, the voltage builds up, sending a proportionate amount of current through the coil, 8. Once the length of the arc reaches the limit fixed by the adjustment of the rheostat, 9, the current through the coil, 8, will become great enough to close the contactor, 4, placing the resistor, 6, in parallel with the arc. This resistance being relatively much lower than the arc, the effect is equivalent to short circuiting the arc, and thus extinguishes it immediately. As soon as the current in the coil, 7, decreases to a definite amount, the contactor, 3, closes, placing the resistor, 5, in parallel with the resistor, 6, thus reducing the resistance in series with the line and therewith the loss. The system is thus restored to its normal condition and is ready to start again.

Figure 5:
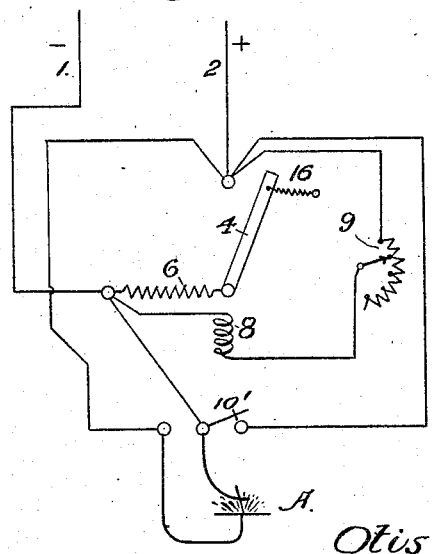
Fig. 5 illustrates an arrangement wherein only one contactor is employed.

The operation of the device shown in Fig. 4 is practically the same as that described for Fig. 3, except that the arc is started by releasing the switch, 4, by means of the push button, 14, which short circuits the holding coil, 11. In both Figs. 3 and 4, the arc voltage rises to the upper limit, drops to a lower value fixed by the resistor, 6, and then to a still lower value fixed by resistance, 5, in parallel with resistor, 6. In Fig. 5 I show an arrangement employing only one contactor and in this instance the bringing of the welding electrode in contact with the work, short circuits the coil, 8, whereupon the arc branch is placed in series with the line and carries the line current. In this condition, the arc may be built up to the limit set by the rheostat in series with the coil, 8. When this limit is reached the coil, 8, closes the contactor, 4, placing the relatively low resistance, 6, in parallel with the arc which extinguishes it immediately, leaving the resistor alone in series with the line.

Having thus described my invention what I claim as new and desire to secure by Letters Patent is:

1. In series arc welding, a welding circuit, a starting resistance, a resistance shunt line, and electro-responsive means for shunting the current around the arc through the resistance shunt at a predetermined voltage across the arc.

2. In series arc welding, a welding arc circuit, a resistance shunt line, and electro-responsive means for shunting the current around the arc through the resistance shunt at a predetermined voltage across the arc and then short-circuiting the shunt line.

3. In series arc welding, a welding arc circuit, a resistance shunt line, electro-responsive means for shunting the current around the arc through the resistance shunt at a predetermined voltage across the arc and then short-circuiting the shunt line, and means for automatically holding the short-circuit until released.

4. In series arc welding, a welding arc circuit, a resistance shunt line, and electro-responsive means for shunting current around the arc through the resistance shunt when the voltage across the arc reaches a predetermined voltage and then gradually reducing the resistance in the shunt line.

5. In series arc welding, a welding arc circuit, a resistance shunt line, electro-responsive means for shunting the current around the arc through the resistance shunt at a predetermined voltage across the arc, and means for reducing the resistance in the shunt when the arc is extinguished.

6. In series arc welding, a welding arc circuit, a resistance shunt line, electro-responsive means for shunting the current around the arc through the resistance shunt at a predetermined voltage across the arc, and means for reducing the resistance in the shunt when the arc is extinguished and then short-circuiting said shunt.

7. In series arc welding, a welding arc circuit, means for raising the voltage therein before the arc is struck, a resistance shunt line, and means for shunting the current around the arc through said resistance shunt at a predetermined voltage across the arc.

8. In series arc welding, a welding arc circuit, means for raising the voltage therein before the arc is struck, a resistance shunt line, and means for shunting the current around the arc through said resistance shunt at a predetermined voltage across the arc and then short-circuiting the shunt.

9. In series arc welding, a main line having a series of welding outlets, artificial line resistance divided between the welding outlets, and electro-responsive means for cutting out each division of resistance during the welding operation of its corresponding arc, and for connecting it into the main line again when the welding operation stops.

10. In series arc welding, a welding arc circuit, a resistor adapted to be connected in said circuit before the arc is struck and to be cut out as soon as the arc is struck, a second resistor, and electro-responsive means for shunting the current around the arc through said second resistor when the voltage across the arc reaches a predetermined limit.

11. In series arc welding, a welding arc circuit, a resistor adapted to be connected in said circuit before the arc is struck and to be cut out as soon as the arc is struck, a second resistor, and electro-responsive means for shunting the current around the arc through the second resistor when the voltage across the arc reaches a predetermined limit and then returning the parts to normal position.

12. In series arc welding, a welding arc circuit, a resistor adapted to be connected in said circuit before the arc is struck and to be cut out as soon as the arc is struck, a second resistor, electro-responsive means for shunting the current around the arc through the second resistor when the voltage across the arc reaches a predetermined limit, and means for connecting the first resistor in parallel with the second resistor when the arc is extinguished.

13. In series arc welding, a welding arc circuit, a resistor adapted to be connected in said circuit before the arc is struck and to be cut out as soon as the arc is struck, a second resistor, electro-responsive means for shunting the current around the arc through the second resistor when the voltage across the arc reaches a predetermined limit, and means for connecting the first resistor in parallel with the second resistor when the arc is extinguished and then returning the parts to normal position.

In testimony whereof I affix my signature.

OTIS ALLEN KENYON.

Copies of this patent may be obtained for five cents each, by addressing the "Commissioner of Patents, Washington, D. C."